United States Patent [19]

Anderson

[11] Patent Number: 4,904,456

[45] Date of Patent: Feb. 27, 1990

[54] APPARATUS FOR TREATING FLUIDS IN A BED OF PARTICULATE MATERIAL

[75] Inventor: Mark R. Anderson, Sweeney, Tex.

[73] Assignee: Phillips Petroleum Company, Bartlesville, Okla.

[21] Appl. No.: 746,906

[22] Filed: Jun. 20, 1985

[51] Int. Cl.[4] ............................................. B01J 8/02
[52] U.S. Cl. .............................. 422/220; 210/282; 261/23.1; 261/75; 261/97; 422/213
[58] Field of Search ............... 422/220, 176, 49, 213, 422/312, 147, 140, 141, 142, 172, 182, 183, 143, 194, 195, 207, 191, 221, 197; 261/19, 20, 23 R, 23 A, 23 B, 75, 97; 210/282

[56] References Cited

U.S. PATENT DOCUMENTS

| 2,045,600 | 6/1936 | Houdry et al. | 422/220 |
|---|---|---|---|
| 2,820,702 | 1/1958 | James, Jr. | 422/219 |
| 3,006,740 | 10/1961 | Maggio | 422/220 X |
| 3,146,189 | 8/1964 | Kunreuther et al. | 422/220 X |
| 3,431,084 | 3/1969 | Forbes | 422/220 X |
| 3,685,971 | 8/1972 | Carson | 422/220 |
| 3,888,633 | 6/1975 | Grosboll et al. | 422/220 X |
| 3,982,902 | 9/1976 | Lortz | 422/147 |
| 4,273,565 | 6/1981 | Worley | 422/310 X |

FOREIGN PATENT DOCUMENTS 2008573  6/1983  Fed. Rep. of Germany ...... 422/220

Primary Examiner—Barry S. Richman
Assistant Examiner—Jill Johnston
Attorney, Agent, or Firm—Richmond, Phillips, Hitchcock & Umphlett

[57] ABSTRACT

Apparatus for the treatment of fluids comprising a vessel containing a fixed bed of particulate material in which a plurality of fluid distribution baskets are suspended from the interior of the upper portion of the vessel and are partially submerged beneath the upper surface of the fixed bed of particulate material. Apparatus is disclosed for mutually securing the lower end portions of the fluid distribution baskets as well as preventing the flotation of the fluid distribution baskets on the surface of the particulate materials during charging of the vessel.

9 Claims, 2 Drawing Sheets

APPARATUS FOR TREATING FLUIDS IN A BED OF PARTICULATE MATERIAL

The present invention relates generally to apparatus for the treatment of fluids being passed through a vessel containing a bed of particulate material.

In the various treatments of fluids, it is often necessary to pass such fluids through a vessel containing a bed of particulate material therein. One such apparatus comprises a vessel having a fluid inlet in the upper end portion thereof and a fluid outlet in the lower end portion thereof. A bed of particulate material, such as, for example, catalyst for the catalytic treatment of fluid within the vessel, is disposed within the vessel up to a predetermined particulate material surface level near the upper end portion of the vessel. In order to facilitate the introduction and distribution of the fluid to be treated from the fluid inlet into the bed of particulate material, it is often desirable to employ a plurality of foraminous fluid distribution baskets suspended from the upper end portion of the vessel with the lower ends of the baskets submerged in the particulate material below the particulate material surface level, and with the upper ends of the baskets extending above the particulate material surface level. These baskets permit the introduced fluid to enter the baskets above the particulate material surface level and then pass from the baskets through their foraminous walls into the bed of particulate material substantially below the particulate material surface level.

A problem encountered when such vessels are charged with particulate material is that, as the level of the particulate material rises up toward the upper end portion of the vessel, the foraminous baskets, whose foraminous walls exclude the entrance of the particulate material therethrough, are buoyed or floated up on top of the rising surface of the particulate material rather than penetrating the surface of the particulate material with their lower ends. When this occurs, it is readily apparent that the foraminous baskets are rendered inoperable in the intended fashion unless other steps are taken to submerge the baskets beneath the surface of the particulate material, such as, for example, by burying each basket manually through the efforts of a human being who has physically entered the upper end portion of the vessel above the surface of the particulate material. Such a procedure can be extremely hazardous to the individual involved if the particulate materials contain vapors or dust particles which are toxic or otherwise harmful to humans.

It would, therefore, be highly advantageous to provide apparatus which would prevent such undesired flotation of the foraminous fluid distribution baskets during charging of the vessel with particulate material and avoid the necessity of manually positioning the baskets in the particulate material bed.

Another potential problem attending the use of the previously described apparatus employing suspended foraminous fluid distribution baskets is that a basket may, under unusual circumstances, separate from its respective suspension element during operation of such apparatus, and the unsupported basket can move downwardly through the particulate material during operation of the apparatus or during draining of the particulate material from the vessel during operation turnaround and thereby cause plugging of the outlet in the lower end portion of the vessel through which the particulate material is being withdrawn.

It would, therefore, also be advantageous to provide apparatus which would prevent such plugging of the vessel outlet in the event of such suspension element failure.

Accordingly, the present invention generally contemplates apparatus comprising a vessel having an upper fluid inlet and a lower fluid outlet and adapted to contain a body of particulate material therein up to a predetermined particulate material level, a plurality of fluid distribution basket means suspended within the upper portion of the vessel with the upper ends of the basket means above the particulate material level and with the lower ends of the basket means below the particulate material level, and basket anchoring means operatively connected to the lower ends of the basket means for maintaining the lower ends below the particulate material level as particulate material is introduced into the vessel up to the predetermined particulate material level. The present invention can also include basket connecting means interconnecting the basket means, preferably below the predetermined particulate material level.

An object of the invention is to increase the efficiency of the treatment of fluids passing through a vessel containing a body of particulate material.

Another object of the invention is to provide apparatus having improved reliability and effectiveness in the treatment of fluids passing through a vessel containing a bed of particulate material.

A further object of the invention is to provide an improved reactor containing a bed of particulate catalyst for the treatment of fluid passing through the catalyst bed.

A still further object of the invention is to provide improved apparatus for the treatment of fluid passing therethrough which is economical in construction and operation.

Other objects, aspects and advantages of the invention will be evident from the following detailed description when read in conjunction with the accompanying drawings wherein.

Figure 1:
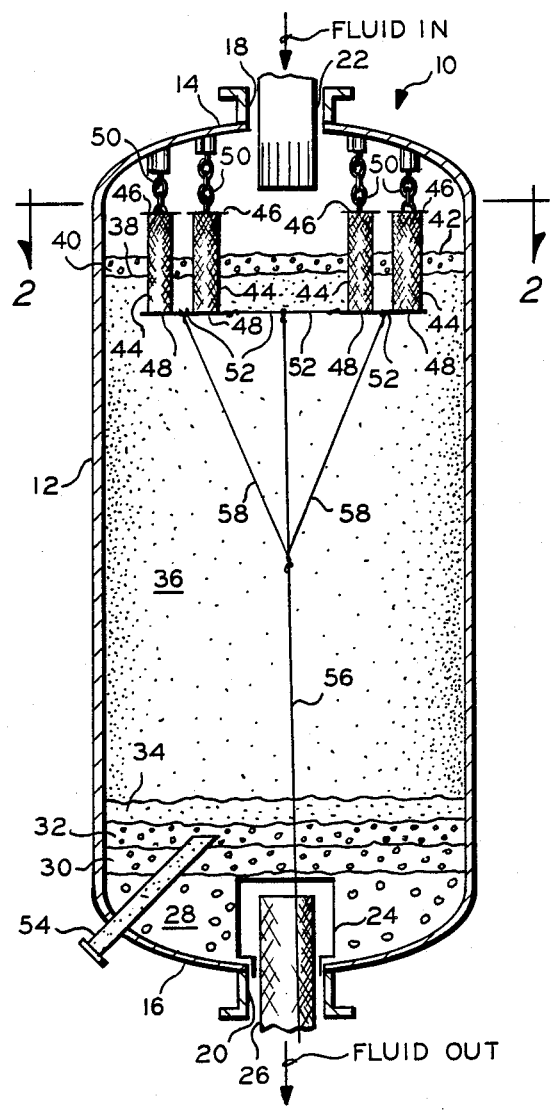
FIG. 1 is a vertical cross-sectional view of apparatus constructed in accordance with the present invention.
Figure 2:
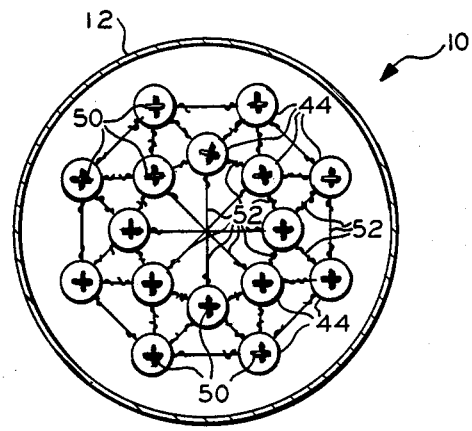
FIG. 2 is a horizontal cross-sectional view taken alone line 2—2 of FIG. 1.

Referring now to the drawings, and to FIGS. 1 and 2 in particular, there is shown apparatus constructed in accordance with the invention generally designated by the reference character 10. The apparatus 10 comprises a vessel 12 having an upper end portion 14, a lower end portion 16. A fluid inlet 18 is provided in the upper end portion 14 of the vessel 12 and a fluid outlet 20 is provided in the lower end portion 16 of the vessel 12. A slotted deflector basket 22 is mounted within the fluid inlet 18. A foraminous outlet cylinder 24 is mounted in the fluid outlet 20 and extends upwardly therefrom into the lower portion of the vessel 12. An outlet screen 26 disposed within the outlet cylinder 24 and extends downwardly therefrom through the fluid outlet 20. The outlet cylinder 24 provides means for excluding the entrance of particulate solid material therepast and the outlet screen 26 provides means for excluding the entrance of much smaller size particulate material therepast as fluid passes from the interior of the vessel 12 through the fluid outlet 20.

In the illustrated embodiment, the apparatus 10 is in the form of a pentane isomerization reactor. As such, the vessel 12 contains a plurality of levels of particulate material including a large bed of suitable isomerization catalyst. As illustrated inn the drawings, the particulate materials include a layer of one inch inert packings 28, a layer of three-quarter inch inert packings 30, a layer of one-quarter inch inert packings 32 and a layer of one-eighth inch inert packings 34 disposed respectively from the bottom up in the lower end portion 16 of the vessel 12 to provide catalyst bed support. A substantial bed of isomerization catalyst 36 extends from the upper surface of the one-eighth inch inert packings 34 to a predetermined particulate material level or catalyst level 38. Preferably, a layer of one inch inert packings 40 lies on top of the catalyst bed 36 to a particulate material level 42.

Fluid distribution basket means in the form of a plurality of foraminous fluid distribution baskets 44, each having an upper end 46 and a lower end 48, are each suspended by suitable suspension means, such as chains 50, from the inside of the upper end portion 14 of the vessel 12. The fluid distribution baskets 44 are positioned relative to the body of particulate material within the vessel 12 with the lower ends 48 of the baskets 44 submerged beneath the particulate material level 42 and the catalyst level 38 a substantial distance into the catalyst bed 36, and with the upper ends 46 thereof positioned above the particulate material level 42.

The level end 48 of each fluid distribution basket 44 is preferably secured to the lower end 48 of the next adjacent fluid distribution basket 44 by suitable mechanical means. It is presently preferred that such interconnection be provided by means of a rigid elongate member of relatively small cross-sectional area such as a length of wire as shown at 52. The wire 52 is selected from among those metals or metal alloys which are neither adversely affected by nor adversely affect the fluid reactants and/or the catalyst materials within the reactor during the operation of the apparatus 10. The wires 52 provide means for securing the fluid distribution baskets 44 together so that, in the unlikely event one of the chains 50 should break during the operation of the apparatus, the fluid distribution basket 44 secured thereby will be supported by its respective wire and prevented from moving to the lower end portion of the vessel 12 and possibly blocking the dump nozzle 54 when the particulate materials are withdrawn from the vessel 12.

The apparatus 10 is further provided with means for maintaining the lower ends 48 of the fluid distribution baskets 44 below the predetermined catalyst level 38 and particulate material level 42 as the vessel 12 is charged with particulate materials. Such means are advantageously provided by a length of wire 56 or the like which is secured at its upper end to one or more of the wires 52. The lower end portion of the wire 56 can either be secured to a suitable terminal within the lower end portion of the vessel 12, or may be extended through the outlet cylinder 24 and outlet stream 26. Under the latter conditions, it can be advantageous to releasably secure the upper end of the wire 56 to one or more wires 52 so that upon completion of the filling of the vessel 12 with particulate material, the wire 56 can be pulled loose from the wires 52 and withdrawn downwardly through the bed of particulate material and out through the lower end portion of the vessel 12. It may be advantageous to utilize additional wires 58 which are secured at their upper ends to corresponding wires 52 or the lower ends 48 of fluid distribution baskets 44, and are secured at their lower ends to the wire 56 to provide more uniform securement of the fluid distribution baskets 44 to prevent their flotation on the rising bed of particulate material during filling of the vessel 12.

The use of relatively rigid wires 52 to mutually secure the lower ends 48 of the fluid distribution baskets 44 provides for precise lateral placement of the fluid distribution baskets 44 during the charging of the reactor vessel 12 since such rigid wires are capable of providing the small amount of compressive strength, as well as tensile strength, to maintain the desired lateral positions of the baskets 44. The relatively small cross-sectional area of the wires 52, 56 and 58, provides substantially no impedance to fluid flow through the particulate material bed and provides virtually no interference whatsoever with the rising level of the particulate material bed during charging of the vessel 12. It will be understood that chains made of similar materials can be substituted for one or more of the wires 52, 56 and 58.

Figure 3:
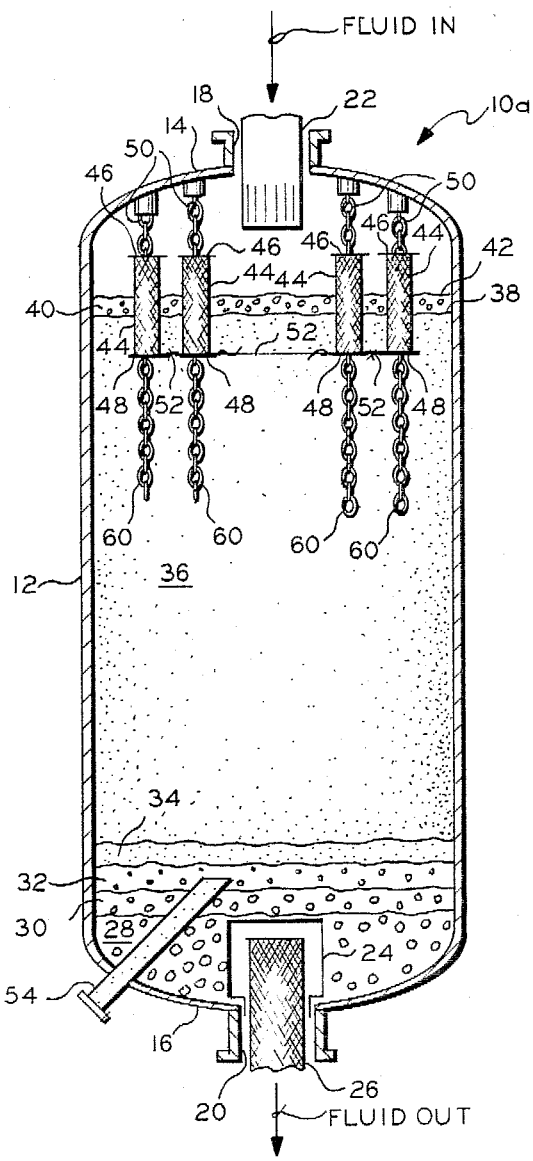
FIG. 3 is a vertical cross-sectional view, similar to FIG. 1, showing an alternate embodiment of apparatus constructed in accordance with the present invention.

Referring now to FIG. 3, an alternate embodiment of the invention is illustrated. Elements of the apparatus of FIG. 3 which are identical to the apparatus described in FIG. 1 are designated by the same reference characters and need not be described again. The apparatus in FIG. 3 is designated by the reference character 10a. The apparatus 10a differs from the apparatus 10 in that the fluid distribution baskets 44 are maintained in proper vertical location within the vessel 12 during the filling of particulate material through the use of a plurality of lengths of chain 60 secured to the lower ends 48 of the fluid distribution baskets 44 and hanging downwardly therefrom. Preferably, one length of chain 60 is secured to the lower end 48 of each fluid distribution basket 44. Each length of chain is constructed of a metal or metal alloy which neither affects nor is affected by the reactants or the particulate materials, such as catalyst, within the vessel 12 during the operation of the apparatus 10a. The lengths of chain 60 are selected such that the weight of each length of chain is sufficient to prevent the fluid distribution basket 44 to which it is secured from floating up with the upper surface of the particulate material as it rises in the vessel 12 during charging of the vessel. Furthermore, as the particulate material rises up around the lengths of chain 60, the lengths of chain serve as anchors secured in the particulate material thus further precisely positioning the lower ends 48 of the fluid distribution baskets 44 within the particulate material bed during charging of the vessel 12.

It will be readily apparent from the foregoing detailed description of two embodiments of the present invention, with reference to the drawings, that the apparatus described herein successfully meets the objects of the invention recited above.

Changes may be made in the combination and arrangement of parts or elements as heretofore set forth in the specification and shown in the drawings without departing from the spirit and scope of the invention as defined in the following claims.

That which is claimed is:

1. Apparatus comprising:
   a vessel having an upper end portion, a lower end portion, inlet means in said upper end portion for allowing introduction of fluids into said vessel, outlet means in said lower end portion for allowing removal of fluids from said vessel, said vessel being adapted to contain a body of particulate material therein;

a plurality of fluid distribution basket means each having an upper end and a lower end, each of said plurality of fluid distribution basket means being suspended within said vessel by suspension means from said upper end portion of said vessel, wherein said suspension means prevents the vertical movement of said fluid distribution basket means towards said lower end portion of said vessel; and basket anchoring means having at least two ends operatively connected at one end to said lower end portion of said vessel and at the other end to said lower ends of said plurality of fluid distribution basket means, wherein said basket anchoring means prevents the floatation of said fluid distribution basket means towards said upper end portion of said vessel.

2. Apparatus in accordance with claim 1 further comprising basket connecting means mutually interconnecting said lower ends of said plurality of fluid distribution basket means.

3. Apparatus in accordance with claim 1 wherein said basket connecting means further comprises a rigid elongated member of small cross-sectional area connected between adjacent fluid distribution basket means.

4. Apparatus in accordance with claim 1 wherein said basket anchoring means further includes basket connecting means mutually interconnecting said lower ends of said plurality of fluid distribution basket means.

5. Apparatus in accordance with claim 4 wherein said basket connecting means portion of said basket anchoring means comprises a rigid elongated member of small cross-sectional area connected between adjacent fluid distribution basket means.

6. Apparatus in accordance with claim 5 wherein said basket anchoring means comprises a rigid elongated member of small cross-sectional area interconnecting said basket connecting means to an anchor point in said lower end portion of said vessel.

7. Apparatus in accordance with claim 1 wherein said basket anchoring means comprises a rigid elongated member of small cross-sectional area interconnecting said basket connecting means to an anchor point in said lower end portion of said vessel.

8. Apparatus comprising:

a vessel having an upper end portion, a lower end portion, inlet means in said upper end portion for allowing introduction of fluids into said vessel, outlet means in said lower end portion for allowing removal of fluids from said vessel, said vessel being adapted to contain a body of particulate material therein;

a plurality of fluid distribution basket means each having an upper end and a lower end, each of said plurality of fluid distribution basket means being suspended within said vessel by suspension means from said upper end portion of said vessel, wherein said suspension means prevents the vertical movement of said fluid distribution basket means towards said lower end portion of said vessel; and basket connecting means mutually interconnecting said lower ends of said plurality of fluid distribution basket means.

9. Apparatus comprising:

a vessel having an upper end portion, a lower end portion, inlet means in said upper end portion for allowing introduction of fluids into said vessel, outlet means in said lower end portion for allowing removal of fluids from said vessel, said vessel being adapted to contain a body of particulate material therein;

a plurality of fluid distribution basket means each having an upper end and a lower end, each of said plurality of fluid distribution basket means being suspended within said vessel by suspension means from said upper end portion of said vessel, wherein said suspension means prevents the vertical movement of said fluid distribution basket means toward said lower end portion of said vessel; and at least one length of chain operatively connected to said lower ends of said plurality of fluid distribution basket means and hanging downwardly therefrom, wherein said length of chain is such that the weight of each of said length of chain prevents the floatation of said fluid distribution basket means toward said upper end portion of said vessel.

* * * * *